United States Patent [19]

Krzywicki et al.

[11] Patent Number: 5,124,024
[45] Date of Patent: Jun. 23, 1992

[54] METHOD FOR EXTENDING HYDROCONVERSION CATALYST LIFE

[75] Inventors: Andrzej Krzywicki, Calgary; Leszek Lewkowicz, Edmonton; Michael C. Oballa, Calgary, all of Canada

[73] Assignees: Nova Husky Research Corporation, Calgary; Alberta Research Council, Nisku, both of Canada; a part interest

[21] Appl. No.: 610,936

[22] Filed: Nov. 9, 1990

Related U.S. Application Data

[63] Continuation-in-part of Ser. No. 438,095, Nov. 20, 1989, abandoned.

[51] Int. Cl.$^5$ ............................................. C10G 47/12
[52] U.S. Cl. .......................... 208/112; 208/52 CT; 208/149; 208/251 H; 208/253
[58] Field of Search .......... 208/112, 108, 149, 52 CT, 208/251 H, 253

[56] References Cited

U.S. PATENT DOCUMENTS

| | | | |
|---|---|---|---|
| 2,899,384 | 8/1959 | Swabb, Jr. et al. | 208/149 |
| 3,546,103 | 12/1970 | Hamner et al. | 208/253 |
| 4,214,977 | 7/1980 | Ranganathan | 208/48 AA |
| 4,370,221 | 1/1983 | Patmore et al. | 208/112 |
| 4,389,301 | 6/1983 | Dahlberg et al. | 208/149 |
| 4,519,897 | 5/1985 | DeJong | 208/149 |
| 4,781,816 | 11/1988 | Lee et al. | 208/52 CT |
| 4,863,887 | 9/1989 | Ohtake et al. | 208/112 |
| 4,875,994 | 10/1989 | Haddad et al. | 208/52 CT |
| 4,969,988 | 11/1990 | Jain et al. | 208/112 |
| 5,057,205 | 10/1991 | Chin et al. | 208/113 |

*Primary Examiner*—Anthony McFarlane
*Attorney, Agent, or Firm*—Dressler, Goldsmith, Shore, Sutker & Milnamow, Ltd.

[57] ABSTRACT

A method for prolonging a hydroconversion catalyst life-time is provided. An additive functional to partially redirect the deposition of catalytic poisoning agents on the catalyst is utilized. The additive may comprise a chemically inert, porous carbonaceous material or ferruginous clay.

3 Claims, No Drawings

METHOD FOR EXTENDING HYDROCONVERSION CATALYST LIFE

CROSS-REFERENCE TO RELATED APPLICATION

This application is a continuation in part of our application for U.S. Letters Patent Ser. No. 07/438,095, filed Nov. 20, 1989, now abandoned.

FIELD OF THE INVENTION

The present invention relates to a method for extending the life of catalysts used in hydroconversion processes.

BACKGROUND OF THE INVENTION

Hydroconversion processes for the upgrading of heavy cretaceous crude oils, bitumens and heavy residues are well known. Upgrading processes are conducted to remove or reduce contaminants in the oil and to convert the heavier components of the oil into lower boiling point hydrocarbon products.

The hydroconversion process is normally conducted in a fixed bed or an ebullated bed reactor. In an ebullated bed reactor the catalyst is ebullated by the liquid and ga thereby expanding the bed to a predetermined level. This near perfect mixing provides better contact between the liquid and gaseous phases and the catalyst. In a fixed bed system a catalyst bed is provided within the reaction zone of the reactor. The method of packing the bed, particle size and bed porosity are determined by the nature of the reactor, and the liquid hourly space velocity. The heavy oil feedstock is reacted with hydrogen at high temperatures.

A heterogeneous catalyst is usually utilized in a commercial hydroconversion process to improve product yield and quality. Exemplary catalysts would include molybdenum, cobalt or nickel deposited on an alumina substrate. However, during the hydroconversion process coke formation will take place. The coke, together with certain metals, (hereinafter collectively referred to as a catalytic poisoning agent), will deposit on the catalyst pellet surface. It has been observed that the coke and metal deposition generally takes place on the catalyst surface, thereby progressively decreasing the active surface area and pore volume thereof. The decrease in catalytic activity thus follows a time activity curve.

Once the catalyst has become deactivated, the methods whereby the poisoned catalyst was replaced are as follows. In the case of a fixed bed reactor system, the reactor is shut down and the catalyst is replaced with new or regenerated catalyst. Alternatively, in the case of an ebullated bed reactor, the catalyst is replaced by continuous addition of fresh catalyst and simultaneous removal of poisoned catalyst These above-described methods are those in current commercial usage. It is to be noted that both reactor shut-downs and catalyst replacement are very costly. Therefore, one continually seeks to prolong the effective life-time of the catalyst.

In Canadian Pat. No. 1,073,389, a process is described for suppressing the deposition of coke on the reactor walls. Coal particles are slurried with the feed and the slurry introduced into an open tube reactor. A catalyst is not utilized.

Ranganathan et. al. in Canadian Pat. No. 1,094,492, teaches a process for preventing carbonaceous deposits in the reaction zone. An iron-coal catalyst is admixed with the feed. An open-tube reactor was used.

It is also known, as disclosed in Canadian Pat. No. 1,117,887 issued to Patmore et. al., that in a particular thermal hydrocracking process the formation and deposition of coke and solids in the reactor poses a major problem. More specifically, the thermal hydrocracking process involves pumping hydrogen and a heavy oil feedstock hydrogenate and/or hydrocrack the feedstock. Reaction pressures of up to 3500 psig and temperatures of up to 500° C. may be utilized. Patmore et. al. discovered that for such a process, the problems of coke deposits forming in the reactor could be overcome by mixing an active catalyst with the feedstock. The catalyst comprised a finely divided carbonaceous material carrying a Group VIA or VIII metal. The heavy oil feedstock and catalyst slurry were passed into an open tubular reactor in the presence of hydrogen and, following reaction, the mixed effluent and catalyst were removed from the hydrocracking zone and treated further.

German Pat. No. 933,648, discloses an iron-sulphate catalyst supported on coke for the hydrocracking of oils.

SUMMARY OF THE INVENTION

In accordance with the present invention there is provided a method for extending the effective life-time of a hydroconversion catalyst. Preferably, the catalysts would be selected from Co—Mo($AL_2O_3$), Ni—Mo($AL_2O_3$) or Ni—W($AL_2O_3$). The method involves the simple expedient of providing an additive in the catalyst-containing section of the hydroconversion reactor. Without being bound by same, it is believed that the additive is functional to partially redirect the deposition of the catalytic poisoning agents thereto. As a result, the quantity of catalytic poisoning agents being deposited on the catalyst is concomitantly reduced. Thus extension of the catalyst life-time is obtained. This 'dilution' of the catalyst by the additive has marked economic advantages too, because of the lower relative cost of the additive. Additionally, it has been noted that higher conversion rates and hydrodesulphurization result when the present method is used.

More specifically, the additive would comprise a chemically inert, porous, carbonaceous material, such as, for example, activated carbon, metallurgical coke, or a petroleum-based coke. Alternatively, materials such as laterite clay or silica may be utilized. It will be readily understood by one skilled in the art that materials lacking the requisite strength to withstand the packing forces and abrasive forces in the reactor would be excluded. Preferably, the additive would be in a granulated or extruded form. The particle sizes of the additive, so as to be physically compatible with the catalyst, would range from 0.1 mm to 5 mm in diameter for granulated material, or would range from 1 mm to 4 mm in diameter and from 2 mm to 8 mm in the average length in the case of extruded material. Most preferably, the additive would comprise granulated material having a diameter ranging from 0.2 mm to 1.6 mm. The specific surface area of the additive would preferably range from between about 3 to 500 $m^2/g$.

In a broad aspect, the invention is a method for prolonging the life-time of a solid catalyst, said catalyst comprising a transition metal, deposited on substrate, and said catalyst being used in a hydroconversion process wherein a heavy oil feedstock is contacted with hydrogen and said catalyst in an ebullated or fixed bed reactor at elevated temperature and pressure, said prolongation being attained by decreasing the rate of deposition of catalytic poisoning agents thereon, which comprises:

using an inert additive in conjunction with said catalyst during said process, said additive being formed of a porous, carbonaceous material selected from activated carbon, metallurgical coke, petroleum-based coke, laterite clay or silica and having a particle diameter of between about 0.1 mm to about 5 mm, said additive further being functional to partially redirect the deposition of said catalytic poisoning agents thereto.

DESCRIPTION OF THE PREFERRED EMBODIMENT

It is to be noted that the objective of the present invention is limited to the extension of the effective life-time of a heterogeneous hydroconversion catalyst. Such a hydroconversion process would be one wherein a heavy crude oil is upgraded to reduce contaminants therein and to convert the heavier components of the oil into lower boiling point hydrocarbon products. The hydroconversion processes to which the invention is applicable are those which are already in commercial operation. The processes are characterized by the following parameters:

a fixed bed or ebullated bed reactor is utilized;

a solid catalyst typically comprising a transition metal (i.e. cobalt, molybdenum or nickel) deposited on substrate is present in the reaction zone; and a heavy oil feedstock is reacted with hydrogen at high temperatures.

After a period of time, the catalyst becomes deactivated because of the deposition of coke and metals. Once deactivated, it is necessary to replace the catalyst with fresh or regenerated stock.

The catalysts with which the additive is utilized in the reaction zone may comprise any of the commercially available hydroconversion catalysts. Such catalysts typically comprise a hydrogenation component which is supported on a refractory cracking base. Exemplary refractory bases may include silica, alumina or composites of two or more refractory oxides such as silica-alumina, silica-magnesia, silica-zirconia, alumina-boria, silica-titania, silica-zirconia-titania, acid-treated clays or the like. Suitable hydrogenation components are selected from the Group VI-B metals, Group VIII metals and their oxides, or mixtures thereof. Particularly useful are cobalt-molybdenum, nickel-molybdenum, or nickel-tungsten on silica-alumina, alumina or zeolite supports.

The additive is placed in the reaction zone in conjunction with the catalyst. The additive should be commingled with said catalyst. The additive may be any suitable, porous, chemically inert, carbonaceous material or ferruginous clay. The additive would preferably be in a granulated or extruded form. Exemplary suitable materials would include activated carbon, metallurgical coke, petroleum-based coke, laterite clay or silica. It will be recognized by one skilled in the art that suitable materials would necessarily possess the mechanical properties to sustain the packing and abrasive forces in the reactor.

The particle size of the additive should be compatible with that of the catalyst pellet size. So the particle size diameter may range from 0.1 mm to 5 mm and most preferably range from 0.2 mm to 1.6 mm in the case of granulated material. In the case of extruded material the particle size would range from 1 mm to 4 mm in diameter and 2 mm to 8 mm in length for extruded materials.

The total packed bed catalyst to additive ratio would range from between 5 to 50%. The preferred range would be 9 to 30%. The following experimental results are given in Table I herebelow to demonstrate the operability of the present invention.

EXPERIMENTAL

The following examples are included to demonstrate the operability of the present invention.

The feedstock is introduced into a fixed bed or ebullated bed reactor and comprises Lloydminister Crude (350°+cut), having the following characteristics:
Density (g/ml @ 25° C.): 0.9868
Viscosity (cP @ 25° C.): 60500
ASTM D-1160 Distillation:
350°–525° C.: 47 (wt %)
525° C.: 53 (wt %)
Elemental Analysis (wt %):
C—84.0;
H—10.2;
N—0.53;
S—4.38

The reaction conditions were as follows:
Reaction temperature 460° C.
LHSV [hr$^{-1}$]: 0.5
Hydrogen Flow Rate [slpm]: 1.0
Reaction Pressure [psi]: <2500
Stirring Rate [rpm]: 1500
Reactor Type: CSTR
Capacity: 330 cc.
Catalyst: 10 g
Additive: 1–4 g The additive is placed in the reaction zone, commingled with the catalyst and the reaction takes place under the above-referenced conditions.

The elemental analysis of the catalyst is given in Table 1 herebelow.

TABLE I

| Description | C [wt %] | H [wt %] | N [wt %] |
|---|---|---|---|
| 1. Presulfided Catalyst | 0.77 | 0.28 | 0.22 |
| 2. After a run using 10 g of catalyst and no additive | 18.19 | 1.19 | 0.79 |
| 3. After a run using 10 g of catalyst plus 4 g of additive B (10–12 mesh) | 17.14 | 1.24 | 0.69 |
| 4. After a run using 10 g of catalyst plus 4 g of additive B (23–28 mesh) | 15.4 | 1.2 | 0.6 |

Thus it will be noted that there is a reduction in carbon deposition on the catalyst in Examples 3 and 4 wherein additive is present as compared with Example 2 wherein catalyst alone or without additive is used.

The deposition of metals on the additive are shown in Table II herebelow.

TABLE II

| Description | V [wppm] | N [wppm] | Fe [wppm] |
|---|---|---|---|
| 1. After a run using 10 g of catalyst plus 4 g of additive B (10–12 mesh) | 475 | 319 | 2990 |

TABLE II-continued

| Description | V [wppm] | N [wppm] | Fe [wppm] |
|---|---|---|---|
| 2. After a run using 10 g of catalyst plus 4 g of additive C (10–12 mesh) | 361 | 548 | 5319 |
| 3. After a run using 10 g of catalyst plus 4 g of additive B (23–28 mesh) | 659 | 2092 | 13296 |

The results of Table II clearly indicate that deposition of V, Ni, Fe onto the additive is occurring.

The physical properties of the catalyst and additive are shown in Table III herebelow.

TABLE III

| | Surface Area [m²/g] | | Pore Volume [cm³/g] | |
|---|---|---|---|---|
| Description | Catalyst | Additive | Catalyst | Additive |
| 1. Pure Components | 144.17 | 61.87 (10–12 mesh) | 0.7132 | 0.2756 (10–12 mesh) |
| 2. After a run using 10 g of catalyst and no additive | 88.01 | — | 0.3719 | — |
| 3. After a run using 10 g of catalyst plus 4 g of additive B (10–12 mesh) | 91.6 | 14.49 | 0.4102 | 0.1472 |
| 4. After a run using 10 g of catalyst plus 4 g of additive B (23–28 mesh) | 99.02 | 12.33 | 0.4366 | 0.1327 |

It is to be observed, therefore, that loss of the surface area of the catalyst due to the activation is less following a run in the presence of additive (see Examples 3 and 4) than in the absence of additive (see Example 2) as compared to the fresh catalyst of Example 1.

The deposits on the catalyst and additive are given in Table IV herebelow.

TABLE IV

| Description | Catalyst [g] | Additive [g] | Total [g] |
|---|---|---|---|
| 1. After a run using 10 g of catalyst and no additive | 3.16 | — | 3.16 |
| 2. After a run using 10 g of catalyst plus 4 g of additive B (10–12 mesh) | 2.51 | 2.39 | 4.90 |
| 3. After a run using 10 g of catalyst plus 4 g of additive B (23–28 mesh) | 2.68 | 1.79 | 4.47 |

Additive B was activated carbon and additive C was metallurgical coke.

Clearly, the results in Table IV hereabove illustrate that less deposition of deactivating agent on the catalyst takes place in the presence of additive (Examples 2 and 3) than when no additive is present (Example 1).

The embodiments of the invention in which an exclusive property or privilege is claimed are defined as follows:

1. A method for prolonging the life-time of a solid catalyst, said catalyst comprising a transition metal, deposited on substrate, and said catalyst being used in a hydroconversion process wherein a heavy oil feedstock is contacted with hydrogen and said catalyst in an ebullated or fixed bed reactor at elevated temperatures up to about 500° C. and pressures of up to about 3500 psig, said prolongation being attained by decreasing the rate of deposition of catalytic deactivating agents thereon, which comprises:

admixing an inert additive in conjunction with said catalyst during said process, said additive being formed of a porous, carbonaceous material selected from activated carbon, metallurgical coke, petroleum-based coke, or laterite clay or silica and having a particle diameter of between about 0.1 mm to about 5 mm, said additive further being functional to partially redirect the deposition of said catalytic deactivating agents upon itself.

2. The method as set forth in claim 1 wherein said additive comprises a granulated material having a particle diameter ranging from 0.2 mm to about 1.6 mm.

3. The method as set forth in claim 1 wherein said additive comprises extruded material having a diameter ranging from about 1 mm to 4 mm and a length ranging from about 2 mm to about 8 mm.

* * * * *